(12) United States Patent
Perrin et al.

(10) Patent No.: US 6,409,944 B1
(45) Date of Patent: Jun. 25, 2002

(54) METHOD FOR PRODUCING A FILTER BOTTOM FOR WATER TREATMENT

(75) Inventors: Didier Perrin, Cormeilles en Parisis; Alain Motte, Bougival, both of (FR)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 09/355,843

(22) PCT Filed: Jan. 27, 1998

(86) PCT No.: PCT/FR98/00146
§ 371 (c)(1),
(2), (4) Date: Sep. 24, 1999

(87) PCT Pub. No.: WO98/36816
PCT Pub. Date: Aug. 27, 1998

(30) Foreign Application Priority Data

Feb. 19, 1997 (FR) .............................................. 97 01963

(51) Int. Cl.[7] ................................................ E04B 1/16

(52) U.S. Cl. ............................. 264/32; 264/35; 264/259
(58) Field of Search ............................. 264/32, 35, 259

(56) References Cited

U.S. PATENT DOCUMENTS 1,183,594 A * 5/1916 Robinson
4,925,556 A * 5/1990 Gaudin et al.
5,087,361 A * 2/1992 Gaudin et al.

* cited by examiner

Primary Examiner—Christopher A. Fiorilla
(74) Attorney, Agent, or Firm—Connolly Bove Lodge & Hutz LLP

(57) ABSTRACT

Method of producing a filter floor for treating water, comprising a structure made of girders or columns supporting a slab which has a number of orifices intended to take suction strainers, characterized in that the concrete of the said structure and of the slab is cast directly in the filter liner, the said structure and the lower part of the slab being shaped by one single design of lost formwork.

4 Claims, 5 Drawing Sheets

METHOD FOR PRODUCING A FILTER BOTTOM FOR WATER TREATMENT

The present invention relates to a method of producing filter floors for treating water and more specifically draining filter floors with suction strainers or nozzles, supporting the filtration material.

It is known that certain filtration operations in the domain of water treatment are performed through filters, particularly filters with a granular filtration material, whose structure, generally made of reinforced concrete, mainly comprises a liner comprising a raft which rests on peripheral walls, and a perforated floor supporting the filtration material.

The functions of such floors are well known to the specialist. These are, in addition to supporting the filtration material, to allow the liquid, particularly the water filtered by the said material during the filtration phase, to pass through and to flow, and to allow for the passage and distribution of fluids during the washing phase.

In general, these filter floors comprise a structure made up of girders or columns, which supports a monolithic slab or a collection of prefabricated slabs.

As far as producing the floor support structure is concerned, there are various possible solutions, specifically:

casting concrete girders or columns in the filter liners;

laying prefabricated girders or columns in the filter liners.

There are also various techniques for producing the upper part of the floor.

Thus, FR-A-2,596,385 reveals a method which consists in assembling prefabricated small-sized slabs or sheet which are installed, connected and fixed to the girders or columns of the support structure by an appropriate anchoring system.

EP-A-0,324,673 describes a method which consists in casting a reinforced concrete slab on lost formwork previously installed on the girders or columns that constitute the filter floor support structure.

There are also techniques involving casting the concrete of the entire support structure/monolithic slab in a single phase, but this technique entails the use of several types of lost formwork for producing the girders or columns and the slab, respectively.

These known techniques exhibit a certain number of drawbacks. Specifically, they entail:

either the assembling of numerous prefabricated elements (slabs, rods, bolts, seals, etc) which is tricky, lengthy and expensive to implement;

or the use of girders, then pre-slabs or lost formwork placed on the girders and finally the casting of a concrete slab, the overall implementation of which proves tricky and expensive;

or the assembly of several types of lost formwork to produce the support structure/slab assembly, this technique also being characterized by being tricky and expensive to implement.

To alleviate the drawbacks of the previous techniques mentioned above, the present invention proposes to provide a method of producing a concrete filter floor which makes it possible to reduce the implementation times and therefore the cost prices.

In consequence, the subject of this invention is a method of producing a filter floor for treating water, comprising a structure made of girders or columns supporting a slab which has a number of orifices intended to take suction strainers, characterized in that the concrete of the said structure and of the slab is cast directly into the filter liner, the said structure and the lower part of the slab being shaped by one single design of lost formwork.

The method according to the invention comprises the following successive steps:

producing the filter liner, installing the reinforcement for the girders or columns of the filter support structure;

positioning lost formwork and securing it;

mounting rings, protected by caps, on the lost formwork at the locations intended for the suction strainers;

producing the reinforcement of the upper part of the slab;

casting the concrete of the support structure and of the slab, removing the caps that protect the rings and mounting suction strainers (11) on the said rings.

According to the invention, the support structure and the slab may be cast in a single stage or in two stages.

The invention is also aimed at lost formwork for implementing the method as defined hereinabove and as a filter for treating water, comprising a concrete floor laid in accordance with this method and employing lost formwork as specified hereinabove.

Other features and advantages of the present invention will emerge from the description given hereafter with reference to the appended drawings which illustrate some entirely non-limiting embodiments thereof.

In these drawings:

FIG. 1 diagrammatically illustrates the implementation of the method that is the subject of the present invention according to a first embodiment;

Figure 1:
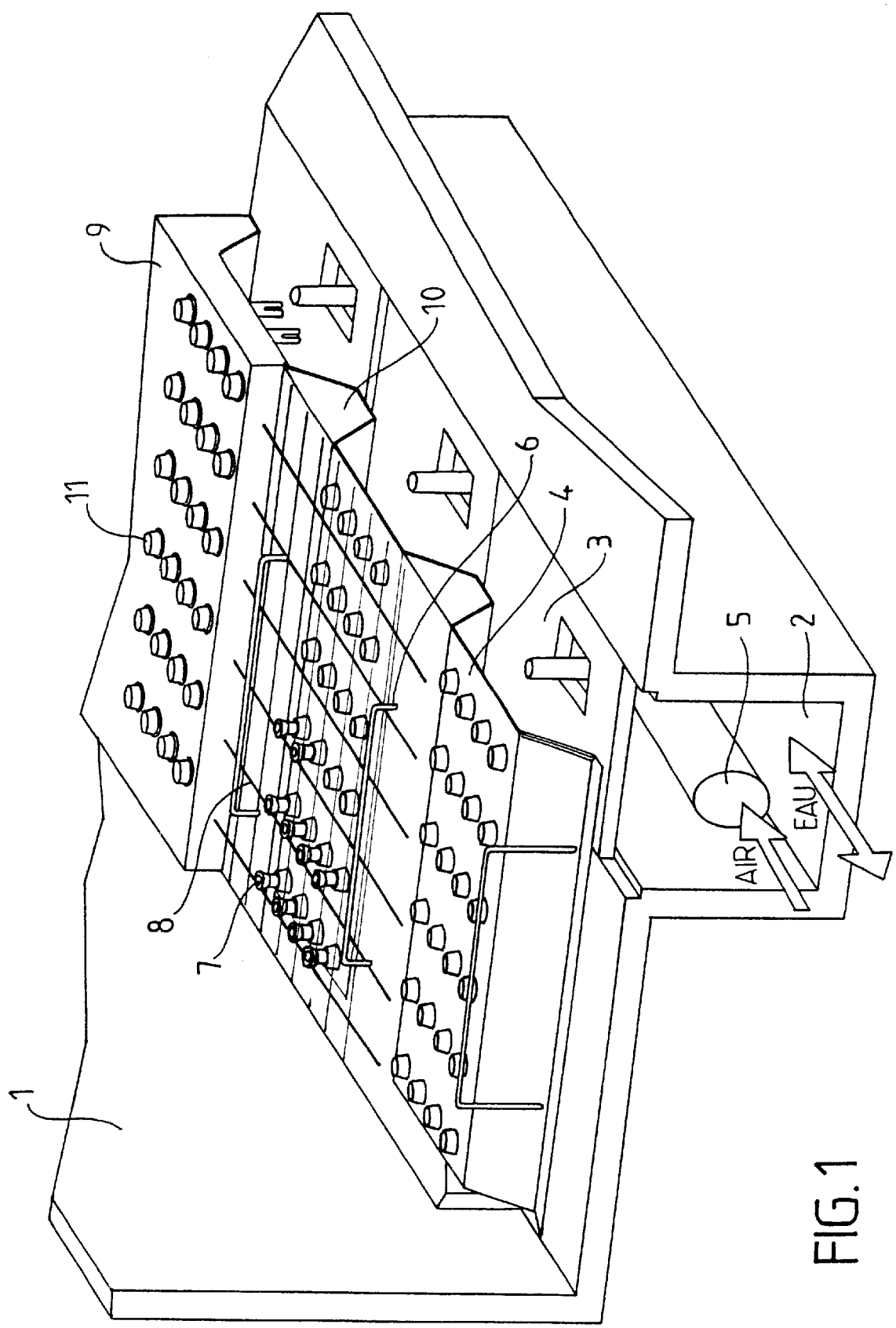

Referring first of all to FIG. 1 which refers to the production of a filter floor in which fluids are collected and/or distributed through a duct 2 lying under the floor of the filter. In this FIG. 1, the reference 1 has been used to denote the filter lining which consists, in the known way, of a raft resting on peripheral side walls. The duct 2 for distributing and/or collecting water is covered with slabs such as 3 which support the formwork 4 according to the invention and allow for the passage of water. A blower manifold 5 is also provided to distribute the air necessary for the method under the filter floor.

According to the present invention, once the filter liner 1 has been made, the reinforcement 6 intended to mechanically secure the floor to the liner is installed. The lost formwork 4 is then set in place and fixed to the liner.

Figure 3:
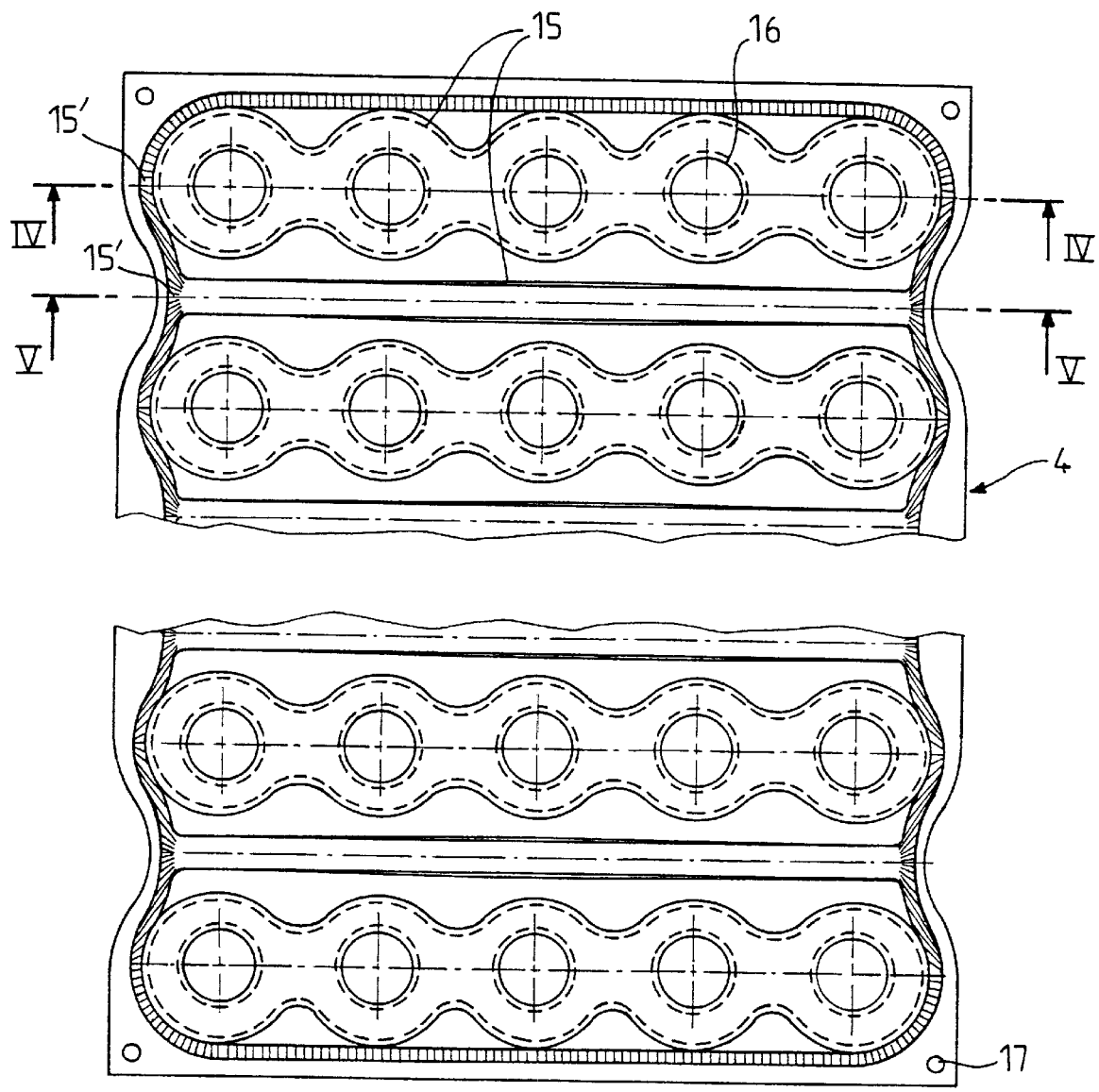
FIG. 3 is a partial plan view of one embodiment of lost formwork used in the method that is the subject of the invention.
Figure 4:
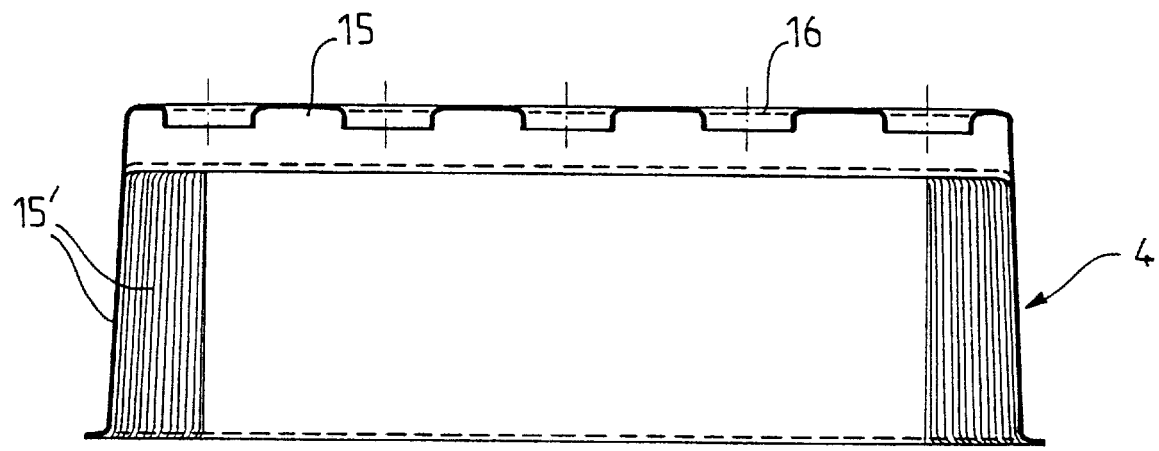
FIGS. 4 and 5 are respectively sections on IV—IV and V—V of FIG. 3, and FIGS. 6 and 7 illustrate an alternative form of the invention in a partial view in vertical section and in a view on F of FIG. 6, respectively.
Figure 5:
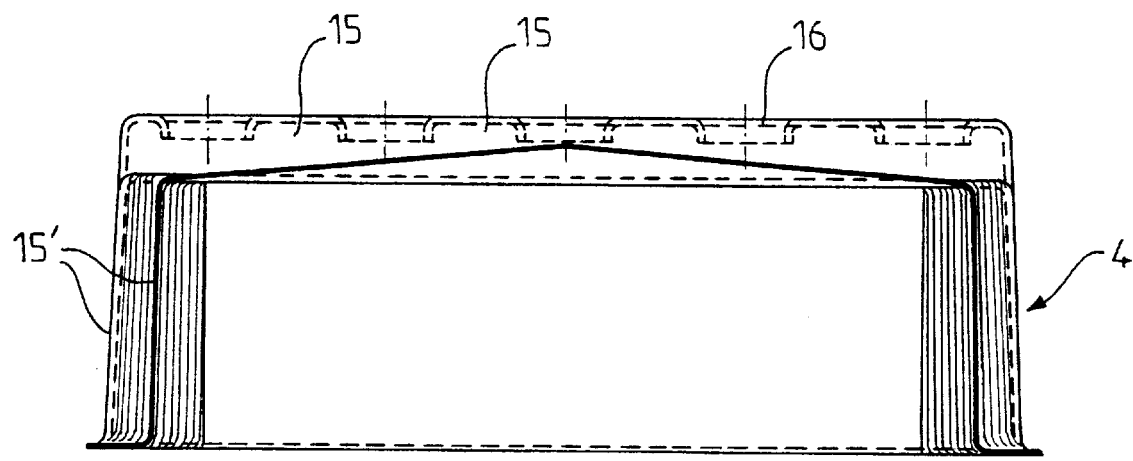

FIGS. 3 and 4 depict one embodiment of a single type of formwork used in the method that is the subject of the invention. This formwork, made of plastic, steel or composite material (resin plus glass fibre, concrete, glass fibre) has a thickness which varies depending on the material, depending on how it was made, depending on its width and depending on its height. As a preference, this thickness is between 1 and 15 mm, for example between 3 and 7 mm. Its height is chosen in accordance with the desired rate of travel of the fluid under the filter floor (choosing a suitable rate makes it possible to obtain good, even distribution across all the suction strainers of one and the same floor) and on the desired accessibility. This height is between 100 and 700 mm, preferably between 120 and 250 mm. The width of the formwork such as 4 is determined as a function of the mechanical properties of the material used to make this formwork, of its cost and of its method of manufacture. According to the invention, this width is between 300 and 1300 mm, preferably between 450 and 700 mm. The length of the formwork may for example be between 2 and 7 metres.

Figure 6:
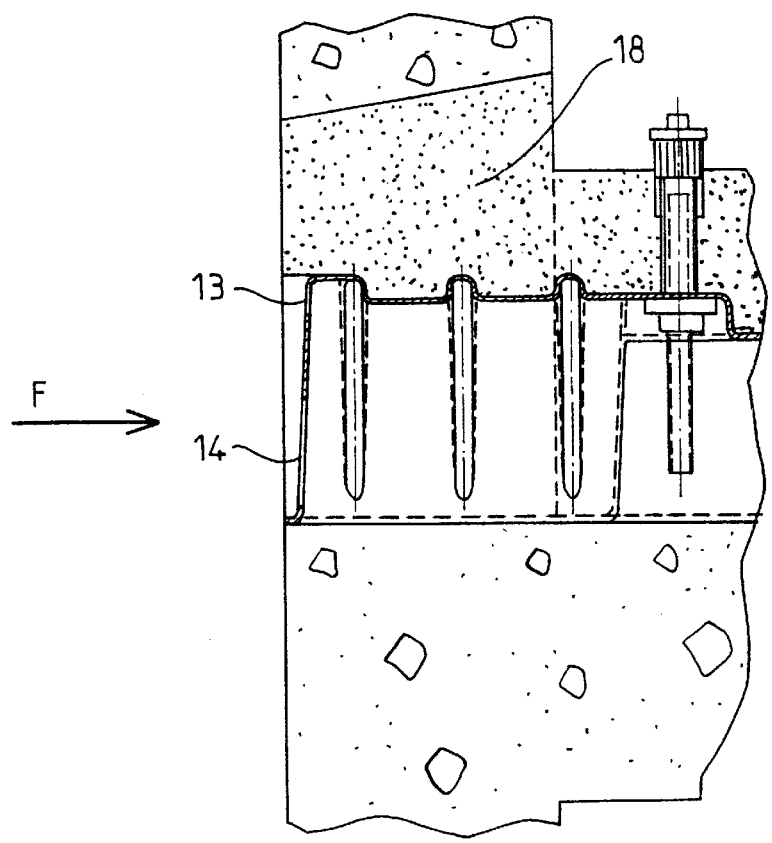
Figure 7:
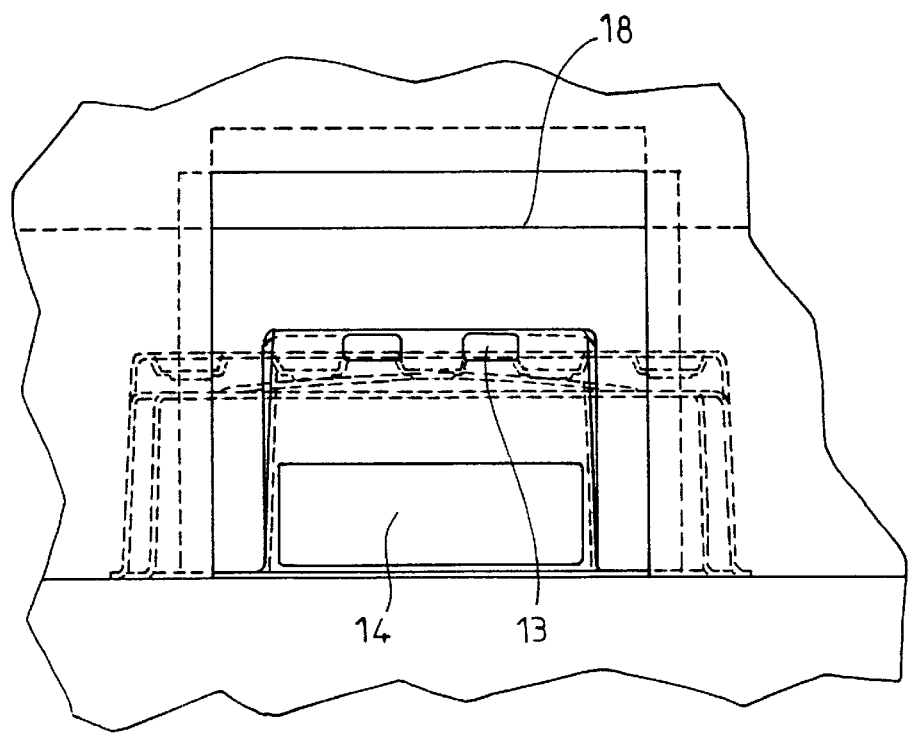

Reference is made to FIGS. 6 and 7 of the appended drawings which illustrate an alternative form of the formwork according to the invention. In this alternative form, air is distributed under the filter floor through orifices such as 13 and water is distributed and/or collected through orifices such as 14. The orifices 13 and 14 are produced at the time of manufacture of the formwork as can be seen in these figures. An orifice of large cross section, and of suitable geometry is made when setting up the formwork for the wall of the filter, this orifice allowing the duct 2 to be connected to the formwork 4. A seal 18 is then made using an appropriate material. In other respects, the implementation of the method of the invention for producing the filter floor using the lost formwork such as 4 is identical to that which was described above with reference to FIG. 1.

The shape of the formwork 4 is chosen in such a way as to obtain a maximum rigidity of this formwork in the horizontal and vertical planes. In the embodiment illustrated in the drawings, the formwork 4 therefore comprises ribs such as 15 and 15'. Their shape is specially designed to reduce as far as possible any pressure drops created by the walls of the formwork. To this end, preference is given, according to the invention, to geometries with steep curvature, particularly on the side walls of the formwork.

In other respects, the shape of the formwork 4 is defined in such a way that the pressures exerted on its side walls by the concrete while it is being cast create a reverse-deflection at the upper part of the formwork to partially compensate for the deflection due to the weight of the concrete. This particular geometry makes it possible to optimize the thickness of the formwork.

The lost formwork such as 4 is fixed together by any appropriate means, the formwork 4 for this purpose being provided with fixing holes such as 17 allowing it to be secured to the filter raft. The seal between the formwork 4 and the raft, or the walls of the filter, is made by an appropriate seal. Each piece of formwork 4 also has, at its upper part, orifices intended to take rings to which the suction strainers or nozzles of the filter floor will be fixed.

Once the lost formwork such as 4 has been fixed to the filter raft, the rings such as 7, fitted with protective caps, are fitted into the orifices 16 provided for this purpose on the upper wall of the lost formwork 4.

The reinforcement 8, intended to provide structural integrity to the slab 9 which will then be cast in the formwork 4, is then installed, and the girders 10 of the support structure, together with the slab 9 of the filter floor, are then produced by casting the concrete in one or two stages.

As soon as the concrete is dry, the caps protecting the rings 7 are removed and the suction strainers 11 are mounted on the rings 7. The filter floor is then finished.

Figure 2:
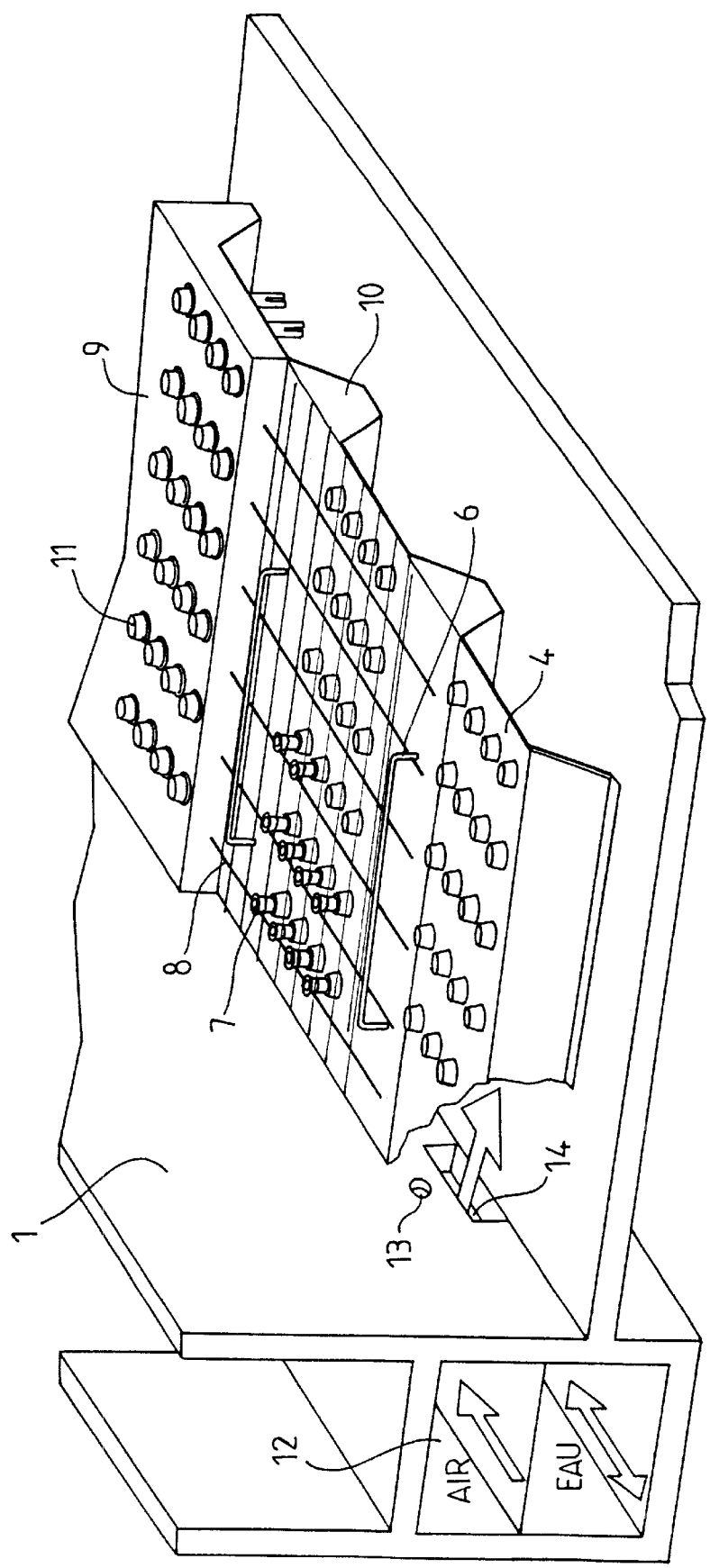
FIG. 2 is a diagrammatic view similar to FIG. 1, illustrating a second embodiment.

The embodiment illustrated in FIG. 2 differs from the embodiment of FIG. 1 only in the fact that the air is distributed and the water is collected and/or distributed by a duct 12 external to the filter liner 1. In this alternative form, air is distributed under the filter floor by orifices such as 13, and water is distributed and/or collected through orifices such as 14. In other respects the implementation of the method of the invention for producing the filter floor using lost formwork such as 4 is identical to that which is described above with reference to FIG. 1.

It remains clearly understood that the present invention is not restricted to the embodiments described and/or depicted but that it encompasses all alternative forms thereof which fall within the scope of the appended claims.

What is claimed is:

1. A method of producing a filter floor in a liner for treating water, the filter floor having a structure resting on the bottom of the liner and a supporting slab which has a number of orifices formed therein intended to receive suction strainers, the structure and the slab being formed by the steps comprising:

assembling lost formwork elements in the lining to create the shape of the structure and the slab;

the shape of the structure and the slab being obtained by placing lost formwork elements of one single design, side by side on the bottom of the liner, the elements being held together by fixing means; and casting concrete directly into the lost formwork.

2. The method according to claim 1, wherein the concrete is cast in a single stage.

3. The method according to claim 1, wherein the concrete is cast in two stages.

4. The method according to claim 1 further comprising the steps:

producing the filter liner;

installing reinforcement for girders of a filter support structure;

securing the side by side lost formwork elements on the bottom of the liner;

mounting rings, protected by caps, on the lost formwork at the locations intended for the suction strainers;

producing the reinforcement of the upper part of the slab; and removing the caps that protect the rings and mounting the suction strainers on the rings after the concrete is cast into the filter lining.

* * * * *